US008856576B2

(12) United States Patent
Stanley-Marbell (10) Patent No.: US 8,856,576 B2
(45) Date of Patent: Oct. 7, 2014

(54) ENERGY CAPTURE OF TIME-VARYING ENERGY SOURCES BY VARYING COMPUTATIONAL WORKLOAD

(75) Inventor: Phillip Stanley-Marbell, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 446 days.

(21) Appl. No.: 13/289,043

(22) Filed: Nov. 4, 2011

(65) Prior Publication Data

US 2012/0117411 A1 May 10, 2012

(30) Foreign Application Priority Data

Nov. 9, 2010 (EP) .................................... 10190429

(51) Int. Cl.
*G06F 1/00* (2006.01)
*G06F 1/32* (2006.01)
(52) U.S. Cl.
CPC ............. *G06F 1/324* (2013.01); *Y02B 60/1217* (2013.01); *Y02B 60/1285* (2013.01); *G06F 1/329* (2013.01); *G06F 1/3296* (2013.01); *Y02B 60/144* (2013.01); *Y10S 323/906* (2013.01)
USPC ............ 713/340; 713/320; 320/101; 323/906
(58) Field of Classification Search
CPC ..... G06F 1/3203; G06F 1/324; G06F 1/3296; H02J 3/383; H01L 31/042
USPC ............ 713/320, 322, 340; 320/101; 323/906
See application file for complete search history.

(56) References Cited

U.S. PATENT DOCUMENTS

| | | | | |
|---|---|---|---|---|
| 5,936,380 | A * | 8/1999 | Parrish .......................... | 320/101 |
| 7,069,463 | B2 * | 6/2006 | Oh ................................. | 713/503 |
| 7,206,949 | B2 * | 4/2007 | Kuranuki ...................... | 713/320 |
| 7,281,145 | B2 * | 10/2007 | Merkin et al. ................ | 713/320 |
| 7,290,156 | B2 * | 10/2007 | Gaskins ......................... | 713/322 |
| 7,512,825 | B2 * | 3/2009 | Winick et al. ................. | 713/340 |
| 7,519,843 | B1 * | 4/2009 | Buterbaugh et al. .......... | 713/322 |
| 7,577,862 | B2 * | 8/2009 | McClendon et al. ......... | 713/500 |
| 7,979,729 | B2 * | 7/2011 | Bletsch et al. ................ | 713/340 |
| 8,037,445 | B2 * | 10/2011 | Poirier et al. ................. | 716/136 |
| 8,193,661 | B2 * | 6/2012 | Jagota et al. .................... | 307/65 |
| 8,645,150 | B2 * | 2/2014 | Akers et al. .................... | 705/1.1 |
| 2009/0216387 | A1 * | 8/2009 | Klein ............................ | 700/296 |
| 2011/0295635 | A1 * | 12/2011 | Basak et al. .................. | 705/7.12 |
| 2013/0099760 | A1 * | 4/2013 | Shizuya et al. ............... | 323/271 |
| 2013/0214608 | A1 * | 8/2013 | Kubota et al. .................. | 307/82 |
| 2014/0041713 | A1 * | 2/2014 | Adler et al. .................... | 136/251 |

OTHER PUBLICATIONS

Xian et al. Energy Reduction by Workload Adaptation in a Multi-Process Environment. 2006.*
Li et al. SolarCore: Solar Energy Driven Multi-core Architecture Power Management. IEEE. 2011.*

(Continued)

*Primary Examiner* — Matthew D Spittle
(74) *Attorney, Agent, or Firm* — Jeff Tang (57) ABSTRACT

A method and system for managing computational workload in a computerized system powered by an energy source. This invention relies first and foremost on adapting computational workload at the computerized system according to a time-varying property of the power supplied by the energy source, such that power generated at the source is optimized. A feedback mechanism is accordingly implemented which changes power available for computation, e.g., to track a more efficient energy generation efficiency point at the source.

14 Claims, 4 Drawing Sheets

(56) References Cited

OTHER PUBLICATIONS

Goiri et al. Parasol and GreenSwitch: Managing Datacenters Powered by Renewable Energy. ACM. Mar. 2013.*

Daler, R. "Energy Management for battery-powered embedded systems", ACM Transacations on Embedded Computer Systems, vol. 2, No. 3, 2003, pp. 277-324.

Chiasserini, "Energy Efficient Battery Management", IEEE Journal on Selected Areas in Communications, vol. 19, 2001.

Benini, L. "Extending Lifetime of Portable Systems by Battery Scheduling", Design Automation and Test in Europe, 2001 Proceedings, pp. 197-201.

Flinn, J., "Managing Battery Lifetime with Engergy-Aware Adaptation", ACM Transactions on Computer Systems, vol. 22, No. 2, 2004, pp. 137-179.

* cited by examiner

ENERGY CAPTURE OF TIME-VARYING ENERGY SOURCES BY VARYING COMPUTATIONAL WORKLOAD

CROSS REFERENCE TO RELATED APPLICATION

This application claims priority under 35 U.S.C. 119 from European Application 10190429.0, filed Nov. 9, 2010, the entire contents of which are incorporated herein by reference.

BACKGROUND OF THE INVENTION

1. Field of the Invention

The invention relates to the field of computer systems, and more specifically, to computational workload management in a computerized system.

2. Description of the Related Art

In today's computerized systems it is necessary for many applications to execute simultaneously. Workload management is thus necessary to harmonize the concurrent execution of such applications. Workload management is needed in several places.

First, it is needed close to the processor level. Here, the operating system typically manages execution of application software. Its central component, i.e., the kernel, is the bridge between applications and data processing carried out at the hardware level. Its main task is to allow for the execution of concurrent applications. To run an application, a kernel typically sets up an address space for the application, loads the application's code into memory, sets up a stack for the program and starts its execution.

Most operating system platforms provide basic job scheduling and process scheduling capabilities, respectively allowing for submission of executions and optimally assigning processes (i.e., instances of computer programs being executed) to run on available CPUs, e.g., to keep them as busy as possible.

For example, in IBM® mainframes, the so-called Workload Manager (WLM) is a base component of the MVS/ESA mainframe operating system and its successors. It controls the access to system resources for the work executing on the operating system.

Also, when several computing units share some workload, workload management is again needed. For example, in an asynchronous client/server network including several servers, each server may be capable of satisfying a client's request, such as to serve a client's request more quickly (if a given server is busy, a request can be forwarded on to another server). In that case, a workload management unit provided on the client side can make a decision as to which server to assign a particular request. Similarly, workload management units may be needed on the server side.

In most cases, workload management is designed to optimize speed, execution time, throughput, etc., so as to achieve the best possible system responsiveness. It usually takes into account the resource capabilities and possibly other constraints, e.g., given rules or company policies, in order to satisfy given business goals, etc.

Besides, systems are known from US 2009/0216387 A1, which allow control of loads coupled to an electric energy or power grid within corresponding ranges of load values in response to one or more factors, such as management of variability in production of renewable energy. In more detail, loads may be controlled in response to an indication of balance between available power and loads and/or in response to new loads and/or grid disconnections, and may be controlled repeatedly over time to adjust a sum load in response to changes in one or more of balance between available power and loads, new loads, and grid disconnections. A load may be repeatedly adjusted over time to provide an electrical power requirement within a time frame while accommodating at least a portion of variations in the balance between available electric power and load.

U.S. Pat. No. 7,519,843 discloses methods and systems for controlling the clock speed of a processor. One implementation involves receiving a real-time precision signal representing available power from a power supply output, monitoring said real-time precision signal, and dynamically adjusting the clocking speed of the processor based on the monitored signal for dynamic processor speed throttling based on available power. The processor is clocked at the maximum speed that matches the maximum output power available from the power supply, and the processor clock frequency is adjusted up or down continuously to always maximize processor performance based on available power at the system level.

BRIEF SUMMARY OF THE INVENTION

In order to overcome these deficiencies, the present invention provides a method of managing computational workload in a computerized system powered by an energy source, including: adapting the computational workload at the computerized system according to a time-varying property of the power supplied by the energy source, wherein the power generated at the source is optimized.

According to another aspect, the present invention provides a computer program product for managing computational workload in a computerized system powered by an energy source, the computer program product including: a computer readable storage medium having computer readable non-transient program code embodied therein, the computer readable program code including: computer readable program code configured to perform the step of: adapting the computational workload at the computerized system according to a time-varying property of the power supplied by the energy source, wherein the power generated at the source is optimized.

According to yet another aspect, the present invention provides a system for managing computational workload in a computerized system powered by an energy source, including: means for adapting the computational workload at the computerized system according to a time-varying property of the power supplied by the energy source, wherein the power generated at the source is optimized.

BRIEF DESCRIPTION OF THE SEVERAL VIEWS OF THE DRAWINGS

Methods and systems embodying the invention will now be described, by way of non-limiting examples, and in reference to the accompanying drawings, where.

DETAILED DESCRIPTION OF THE PREFERRED EMBODIMENTS

Aspects of the present invention are directed to the management of computational workload in a computerized system. Broadly, the invention proposes to adapt computational workload according to a time-varying property of the power supplied by the energy source powering the computerized system, such that the power generated at the source is optimized. This notably results in optimizing energy generation at the source. A feedback mechanism is accordingly implemented which changes power available for computation, e.g., to track a more efficient energy generation efficiency point at the source. For example, this property can be related to an optimal terminal voltage of a photovoltaic system. In such a case, computational workload is, for instance, varied to deplete a charge storage device connected to the source, such that its terminal voltage tracks the maximum power point of the source. An alternative to energy storage is thereby achieved, which relies on the direct conversion of energy into a form having economic value, low storage costs and low transportation costs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable non-transient program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable non-transient program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Non-transient program code embodied on a computer readable medium may be transmitted using any appropriate medium, including but not limited to wireless, wireline, optical fiber cable, RF, etc., or any suitable combination of the foregoing.

Computer non-transient program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The non-transient program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
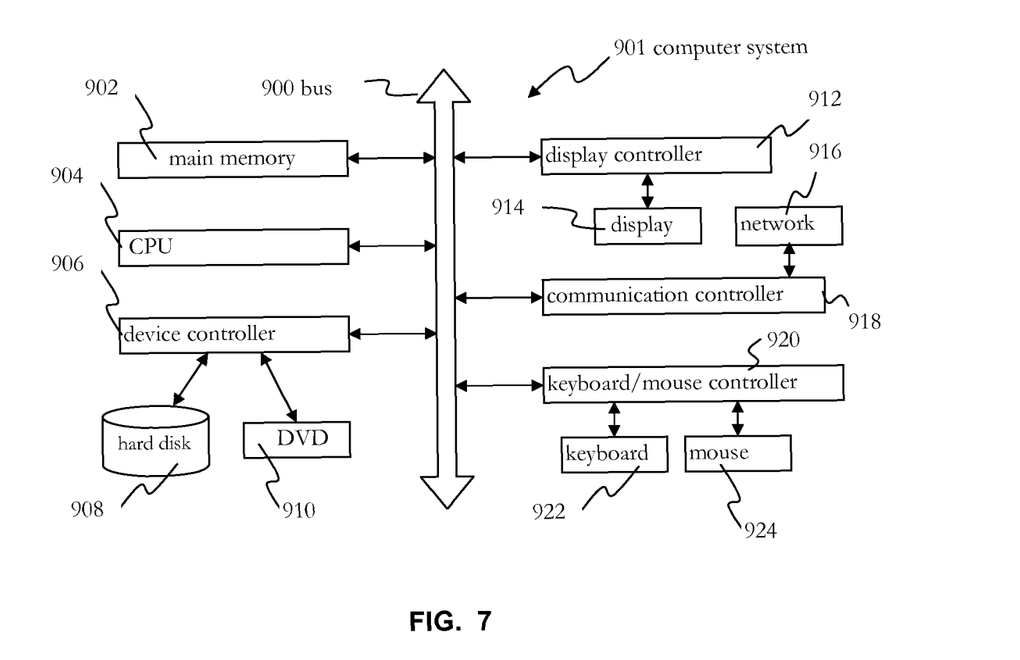
FIG. 7 is a block diagram of computerized system hardware, according to embodiments of the invention.

FIG. 7 is a block diagram of hardware of a computer system, as it relates to embodiment of the invention. The computer system 901 includes a CPU 904 and a main memory 902, which are connected to a bus 900. The bus 900 is connected to a display controller 912, the latter connected to a display 914 such as an LCD monitor. The display 914 is used to display information about a computer system. The bus 900 is also connected to a storage device, such as hard disk 908 or DVD 910 through a device controller 906 such as an IDE or SATA controller. The bus 900 is further connected to a keyboard 922 and a mouse 924 through a keyboard/mouse controller 920 or a USB controller (not shown). The bus is also connected to a communication controller 918, which conforms to, for example, an Ethernet registered trademark protocol. The communication controller 918 is used to physically connect the computer system 901 to the outer world, i.e., a network 916. The latter may, for instance, include a monitoring unit, for monitoring the time-varying property evoked earlier, in various embodiments.

Figure 1:
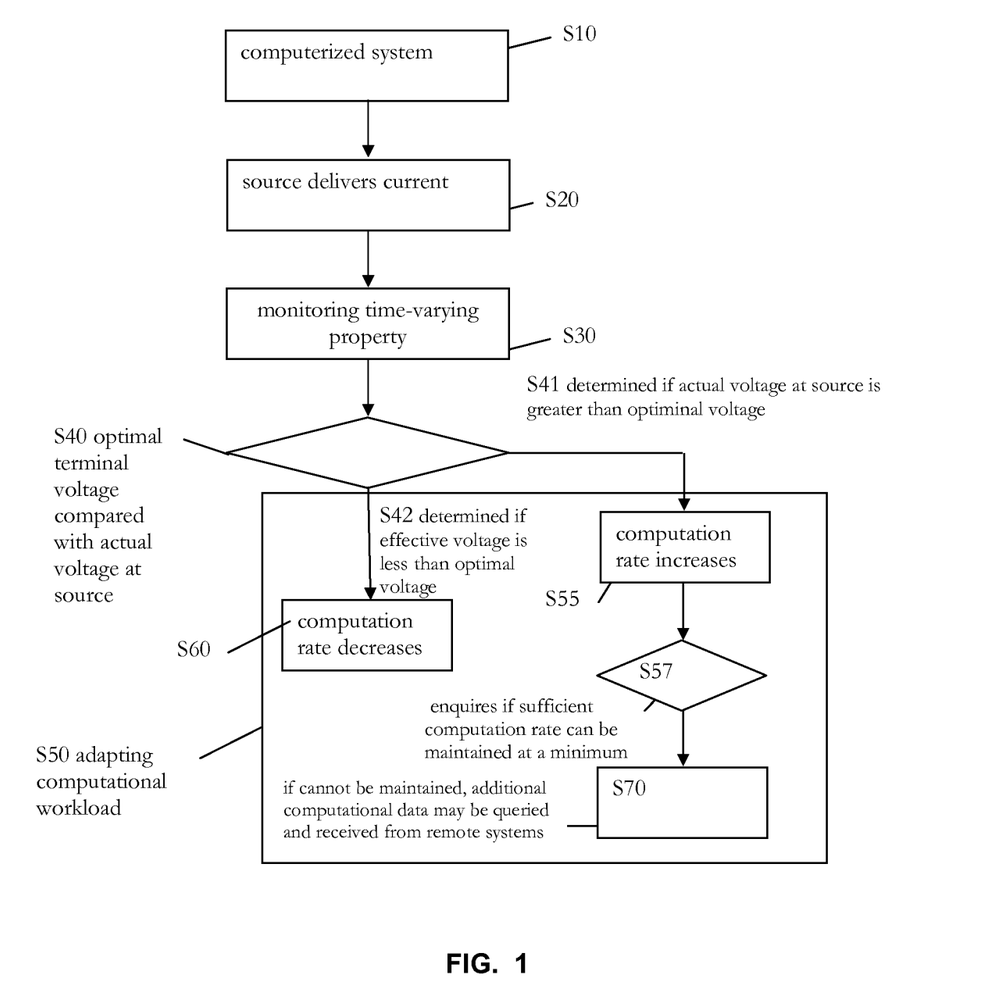
FIG. 1 is a flowchart reflecting an embodiment of a method for managing workload in a computerized system, according to the invention.
Figure 2:
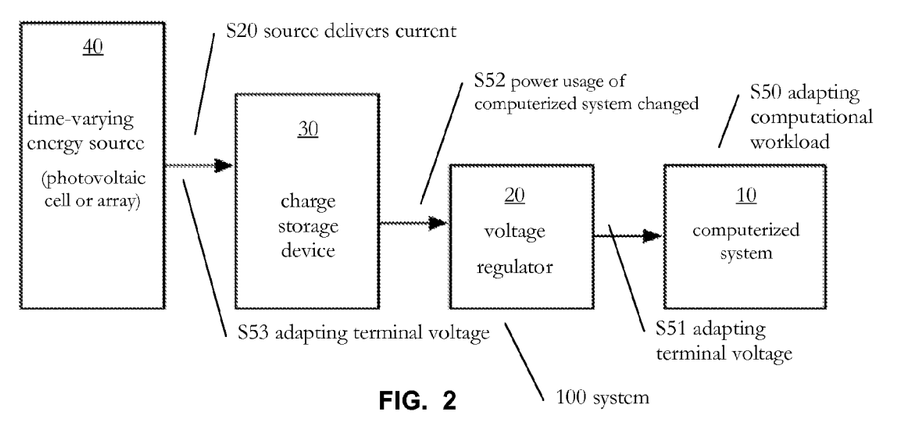
FIG. 2 is a schematic view of a system which can embody the present invention.
Figure 3:
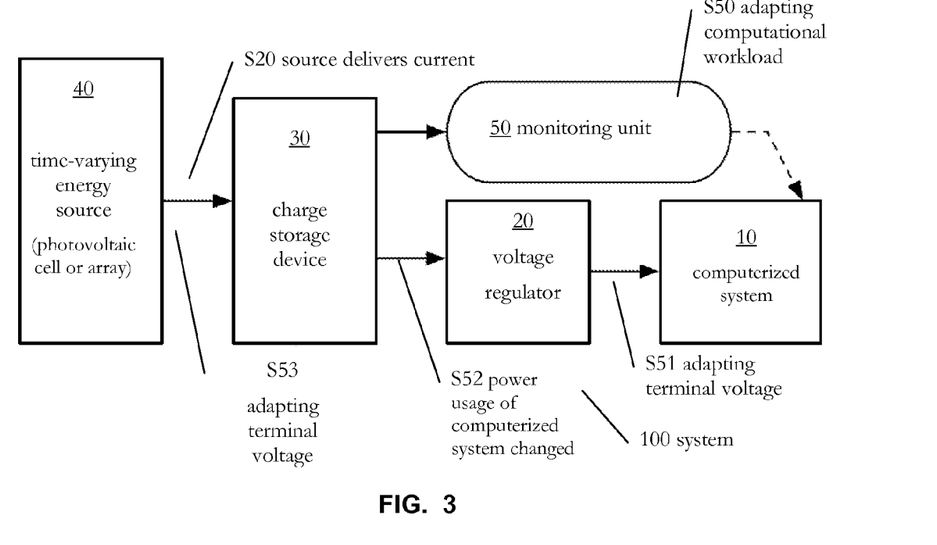
FIG. 3 is a schematic view of a system which can embody the present invention.

FIG. 1 is a flowchart reflecting steps of a method of workload management in a computerized system, such as the one schematized in FIG. 7. FIGS. 2 and 3 schematically depict system variants which can suitably embody the present invention.

In reference to FIGS. 2-3, a system 100, including a computerized system 10 is provided. This is noted as step S10 in FIG. 1. Computerized system 10 is powered by a time-varying energy source 40. The source may, e.g., be a solar source such as a photovoltaic system. Such energy sources are known per se. In that case, the system is preferably powered through a charge storage device 30. In an embodiment, a voltage regulator 20 can be included, as shall be discussed later.

As stated, a main step of the method is to adapt computational workload in a computerized system, according to a time-varying property of the power supplied by the source. This is represented as steps S50 in FIGS. 1-3. As a result, power available for computation shall be changed to a more valuable conversion point.

To do so, the time-varying property may need to be monitored in step S30 of FIG. 1, e.g., by logic monitoring software or hardware, inside the computer system or in communication therewith. In this case, computational workload is varied according to the monitored property. In alternative embodiments, time variations of this property may be predetermined. Additionally, intermediate situations can be contemplated. For example, this property can be only partly predetermined, whereby some monitoring remains necessary. If this property reaches some threshold value, the method may switch from a first mode (computation is adapted based on predetermined time variations) to the second mode (computation is adapted based on observed variations). More intricate scenarios can also be devised.

The time-varying property considered here is, for instance, an "optimal" voltage (or a function thereof) at an output of the energy source. In the case of photovoltaic sources, the voltage can for instance be considered optimal inasmuch as it is the voltage at which the highest power is delivered. Other considerations can nonetheless impact the "optimality" of the property, which may result from technical considerations (e.g., power, heat dissipation, conversion, wear, etc.) or not (e.g., given policies, business schemes, time-varying price, etc.). It remains that the property is a time-varying property of the power delivered by the source.

Figure 4:
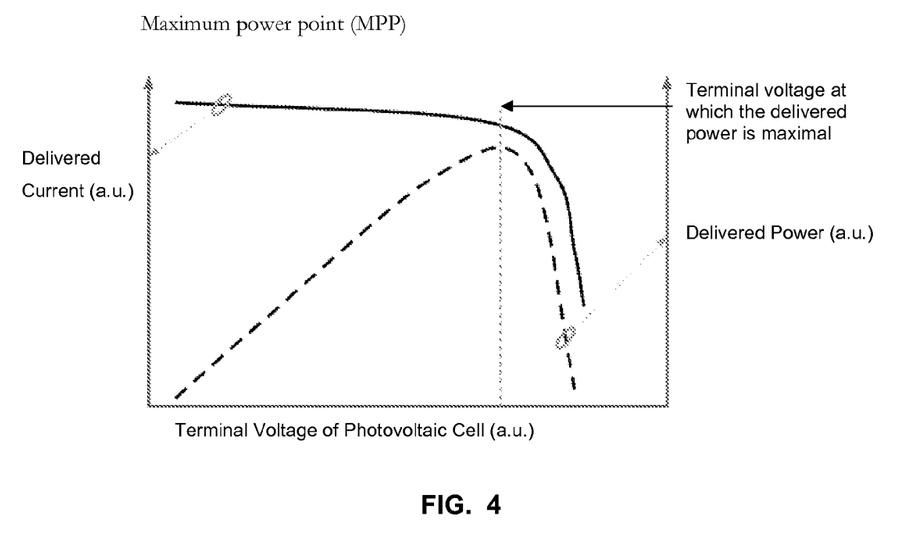
FIG. 4 illustrates the concept of maximum power point (MPP) in photovoltaic energy sources, as used in embodiments.

Next, several methods for determining said optimal property can be contemplated. Suitable classes of methods rely on predicting or modeling the optimal property (e.g., the optimal voltage) based on observed properties such as the current actually delivered by the source. An example of a method is the so-called maximum power point or MPP, which is illustrated in FIG. 4. The plain line curve represents the delivered current with respect to the terminal voltage at the source (arbitrary units or a.u.). The dashed line is the delivered power, which can be measured or deduced based on, e.g., the measured current (considering, e.g., P=IV). The vertical dotted line represents the terminal voltage at which the delivered power is maximal. This example illustrates how power generation can be optimized, with respect to a time-varying property thereof (in this case the voltage at the source).

Referring back to FIGS. 1-3, the steps of adapting computational workload (step S50) essentially means varying the rate of computation. This results in changing the power needed as input, and so the power is delivered by the source to a more optimal functioning point. To do so, several methods can be contemplated.

A first possibility consists of adapting the job scheduling only. Other possibilities (not necessarily separate) would be to adapt the process scheduling and/or to act at the thread level. In all cases, this can be achieved by causing CPUs to be intermittently idle, which effectively results in varying the rate of computation. As most CPUs allow for power save when they are idle, one understands that simple adaptation schemes can be devised. For example, the number of idle periods of time may depend linearly on the monitored property.

A second possibility is to vary the clock frequency f of execution at the processor(s) while the input voltage at said processor(s) is not modified, which again results in varying the effective computation and power usage.

Such a scheme can be improved by further adapting the input voltage $V_{dd}$ at the processors. This adaption, however, is more complex to implement. Indeed, the frequency f of execution can be varied such as to impact the current drawn and terminal voltage. Correspondingly, the input voltage $V_{dd}$ can be adjusted according to any convenient relation, i.e., giving the optimal $V_{dd}$ as a function of f. One empirical relation is:

$$f = K \frac{(V_{dd} - V_t)\alpha}{V_{dd}}$$

In this equation, K is a constant and α depends on the process technology. Typically, α varies between ≈1 for smaller geometries (e.g., 45 nm or 65 nm) to ≈2 for longer geometries (e.g., 180 nm). Other relations can be used, depending on the context. Adjusting $V_{dd}$ together with f puts the processors at a more optimal operating point. This further allows for optimizing power dissipation at the processors, in addition to changing the power usage.

When the computerized system 10 is powered through a charge storage device 30 (as in FIG. 2 or 3), varying the computation results in depleting the charge storage device, which in turn impacts its actual terminal voltage $V_{cs}$. This can be carried out such as to track the optimal voltage $V_{MPP}$ at the source.

To this aim, after the source begins delivering current in step S20 of FIGS. 1-3, one may monitor the charge state of the storage device to obtain, in step S30 of FIG. 1, the MPP of the source. The MPP determines an optimal terminal voltage $V_{MPP}$ at the charge storage device and, in turn, an optimal voltage at the output of the source. Then, the desired, i.e., optimal voltage $V_{MPP}$ can be compared with the actual voltage Vs at the output of the source in step S40 of FIG. 1. The workload can accordingly be optimally adapted in step S50 of FIGS. 1-3. When doing so, the power usage of the computerized system is changed, which in turns impacts the depletion rate at the charge storage system 30, see step S52 in FIG. 2 or 3. Eventually, this results in adapting the terminal voltage $V_{cs}$ of the subunit 30, step S53 of FIGS. 2 and 3, and thus the voltage at the source ($V_s=V_{cs}$).

Referring now to FIG. 1, in practice the rate of computation shall increase (step S55) if the actual voltage $V_s$ at the source is larger than the optimal voltage $V_{MPP}$, step S41. Similarly, the rate is decreased (S60) if the effective voltage is smaller than the optimal voltage, step S42.

In alternative embodiment, thresholds can be contemplated. For example, the computation rate could be maintained at a minimum, even if the conditions are not the most favorable. Conversely, a high computation rate could be assumed by defaults and/or a maximal rate could be imposed (other than that fixed by the processors).

In addition, the algorithm preferably enquires whether sufficient computational workload is available in step S57. If not, additional computational data may be queried and received from remote systems in step S70 in order to track the optimal voltage. Conversely, the local system may be queried and invited to delegate computation that was initially scheduled for it.

In all cases, the workload is adapted according to a time-varying property of the power supplied by the source, which impacts power available for computation and allows for optimizing the energy generation efficiency.

This is advantageous inasmuch as computing tasks constitute a substantial and increasing fraction of energy usage today. In this respect, computational energy needs have trended towards situating datacenters in locations with inexpensive energy supplies. In contemporary systems however, the power generation and usage are separated by a power grid; this incurs losses in power delivery.

Renewable energy sources such as wind and the various forms of solar energy (photovoltaic or PV, concentrated solar-thermal or CST, etc.), require additional investments in energy storage facilities, as their power output often varies significantly over time, e.g., cloud cover and nightfall lead to reduced output power from solar energy sources. In the case of photovoltaics, the efficiency of capture of energy also varies based on the voltage at which the cells of an array are held, since photovoltaic systems have an optimal output terminal voltage VMPP at which they deliver maximal output power. This optimal terminal voltage depends e.g., on the level of incident sunlight (i.e., solar insolation), and is known as the maximum power point, as evoked earlier in reference to FIG. 4. Some solar arrays use an adaptive circuit to continuously vary the output terminal voltage to track the maximum power point as incident sunlight varies, a technique known as maximum power point tracking (MPPT). Contemporary MPPT systems use a circuit to calculate the MPP, and force the photovoltaic cell or array to operate at that output voltage.

Here, the source is not forced to operate at the optimal voltage. Instead, suitable logic is implemented to force the computerized system to operate such that the output voltage remains close to the desired one. For instance, in the system configuration of FIG. 2, an application of the present invention results in using computing workload to deplete the charge from a storage cell 30 to which the photovoltaic cell or array 40 is connected. It achieves MPP control by varying the rate at which computation occurs, while simultaneously achieving energy conversion of the energy generated by the photovoltaic system.

In other words, the energy generated at the source is consumed in the entropy transformation associated with the computation. The computation may accordingly be seen as an energy conversion process. One way to view the computation in this manner is as an exchange between energy and entropy with respect to the desired form of a piece of information. For example, given a quantity of data (e.g., 1 terabyte of text), in which we would like to count the number of occurrences of a given string, the process that reduces the original input data set to a possibly smaller set that precisely answers our query can be thought of as reducing the entropy of the system from the viewpoint of an observer. In this example, the process is irreversible, and the minimum energy required is $k_B T \ln(2)$ Joules per bit of information (possibly not relevant to the query) destroyed. This follows from the definition of the microcanonical ensemble entropy and associated energy variation, wherein 2 is the number of accessible microstates, and $k_B$ and T respectively denote the Boltzmann constant and the temperature.

Energy can effectively be transmitted by performing the string search computation for a requester at a remote site, who thus achieves an effective increase in available energy, as they no longer need to use locally available energy to perform the computation. Similarly, energy can effectively be stored at the site of energy production by using it to perform computations.

Storing and exchanging energy in the form of completed computation has a variety of benefits. The efficiency of storage and efficiency of transmission of this form of "potential energy" will furthermore improve over time with the progress of technology. Large amounts of energy can be transmitted at very low overhead by requesting computation requiring little input and large amounts of computation, to be performed at a remote energy source.

Unlike mechanisms to control the load of a system, in order to match power supply (see e.g., Patent Application US 2009/0216387), systems described herein use computation as a means of effectively storing/capturing time-varying energy sources. This is in contrast to a device for controlling an energy load in order to balance available power to load, which does not involve using computation as a means of energy storage. In contrast to a system for adapting the clock speed of a processor, based on maximum available input power (see e.g., U.S. Pat. No. 7,519,843), systems described herein use the insight that when CPUs use energy, the computation they perform has value. Thus the power usage of a processor can be used as an energy-conversion system. Furthermore, computation is adapted, not just to the available energy (i.e., not just to the maximum permissible), but rather to the level that achieves the maximum energy generation efficiency (as power delivered by the source is optimized).

As discussed above and with reference to FIGS. 2 and 3, in an embodiment the components of the general system can be a photovoltaic cell or array (PV subsystem 40), a charge storage device 30, a computing system 10 (e.g., involving at least a microprocessor) and an optional voltage regulator 20 if, e.g., the computing device requires a fixed operating voltage and can not run directly off the charge storage device. In variants, the subsystem 30 could be part of the source or the computing system. Similarly, the subsystem 20 could be part of the storage device 30 or the computing system 10. Incidentally, one understands that the present invention can suitably be implemented together with any energy source (solar, hydroelectric, wind, etc.) that varies based on, e.g., the voltage at which the cells of an array are held. More generally, use can be made of any source, whose optimal energy generation point varies over time. Thus, more generally, the invention takes care of adapting computational workload at the computerized system according to a time-varying property of the (time-varying) power supplied by the energy source, such as to optimize power generated by the source.

In an embodiment shown in FIG. 3, a monitoring unit 50 (distinct from the computerized system 10) can be provided to monitor the charge storage device and PV. Again, this unit can yet be integrated to other subunits. The unit is in an electrical connection with the charge storage device 30 (and/or the source), such that it can sense an electrical signal (current flow or voltage sensing). It is therefore possible to check the charge state and/or current from the source. Note that the monitoring unit 50 could be set in electrical connection with the source only. The monitoring unit 50 is furthermore "logically" connected to the system 10, to provide feedback about the state of charge of the charge storage device 30 or the source voltage $V_s$. Such feedback is in fact provided to the logic (program, OS, or circuit) in charge of adapting the computational workload at the computerized system. It can accordingly be proceeded to calculate the MPP, the desired terminal voltage of charge storage cell, and hence the desired voltage at the output of the PV subsystem. Such a calculation can for instance be performed according to a schedule.

Then, as in previous embodiments, if the terminal voltage of the charge storage cell is above the desired optimal terminal voltage, said logic directs the computing system to increase its computation rate, depleting the charge storage device and bringing its operating voltage to the optimum level. On the contrary, if the terminal voltage is below the optimal point, it directs the computing system to throttle its computing rate.

Figure 5:
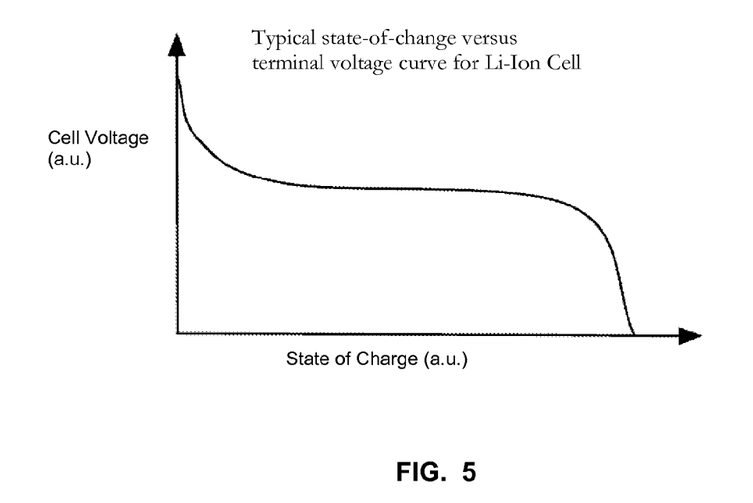
FIG. 5 depicts a typical state of charge versus terminal voltage curve for a Li-ion charge storage device.
Figure 6:
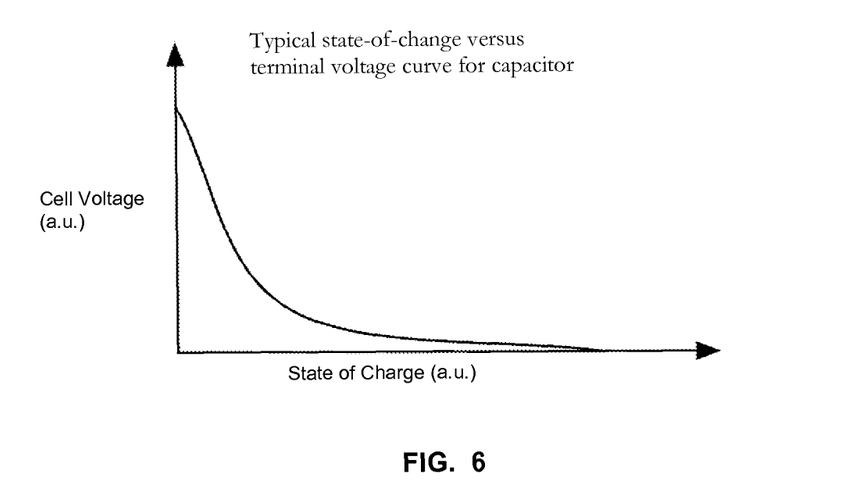
FIG. 6 depicts a typical state of charge versus terminal voltage curve for a capacitor.

The degree by which the computation rate is increased or decreased can, e.g., be determined by a combination of the dependence of the power dissipation of the processor on its processing rate, and the dependence of the charge storage device's terminal voltage on its state of charge. Illustrations of the dependence of terminal voltage on state of charge are shown for a Lithium-ion cell (FIG. 5) and capacitor (FIG. 6).

The dependence of processing rate on power dissipation may result from a variety of implementation strategies for the computerized subsystem 10. For example, a computerized subsystem composed of a single microprocessor can achieve adaptation of power dissipation by the variation of its clock frequency, operating voltage, or both, as discussed earlier. On the other hand, a computerized subsystem including multiple processors (or a multi-core processor), can adapt its computing rate and power dissipation by employing more or fewer processing cores.

The invention claimed is:

1. A method of managing computational workload in a computerized system powered by an energy source, comprising:
    adapting said computational workload at said computerized system according to a time-varying property of the power supplied by said energy source, wherein said power generated at said source is optimized;
    powering said computerized system by said enemy source through a charge storage device;
    varying, during adapting, said computational workload at said computerized system to deplete said charge storage device according to said time-varying property; and
    obtaining, prior to said adapting, a maximum power point of said energy source;
    wherein an optimal terminal voltage at said charge storage device and, in turn, an optimal voltage $V_{MPP}$ at an output of said energy source are determined; and
    wherein said adapting comprises varying said computational workload according to said determined optimal voltage $V_{MPP}$ at said output of said energy source.

2. The method according to claim 1, further comprising:
    monitoring said property, wherein adapting said computational workload is carried out according to said property as monitored.

3. The method according to claim 1,
    wherein time variations of said property are at least partly predetermined; and
    wherein adapting said computational workload is at least partly carried out according to said time variations of said property as predetermined.

4. The method according to claim 1, wherein adapting said computational workload comprises varying a rate of computation by varying at least one of:
    a job scheduling at one or more processors of said computerized system;
    a frequency f of execution at one or more processors while not modifying a voltage $V_{dd}$ at said one or more processors; and
    a frequency f of execution at one or more processors and correspondingly adjusting a voltage $V_{dd}$ at said one or more processors, according to a relation wherein said voltage $V_{dd}$ is made optimal at said one or more processors as a function of a given frequency.

5. The method according to claim 1, wherein said time-varying property is a function of an optimal voltage $V_{MPP}$ at an output of said energy source.

6. The method according to claim 5, wherein said optimal voltage $V_{MPP}$ is determined according to a maximum power point of said energy source.

7. The method according to claim 1, wherein said adapting comprises:
    comparing an optimal voltage $V_{MPP}$ with an actual voltage $V_s$ at an output of said energy source; and
    varying said computational workload according to a result of said comparing.

8. The method according to claim 7, wherein said varying further comprises at least one of:
    increasing a rate of computational workload, wherein said actual voltage $V_s$ is larger than said optimal voltage $V_{MPP}$; and
    decreasing said rate of computational workload, wherein said actual voltage $V_s$ is smaller than said optimal voltage $V_{MPP}$.

9. The method according to claim 1, wherein:
    said computerized system is powered by said energy source through a charge storage device and a voltage regulator; and
    said adapting comprises varying said computational workload to affect a current drawn by said voltage regulator, to deplete said charge storage device according to said time-varying property of said energy source.

10. The method according to claim 1, wherein said energy source comprises a solar energy source.

11. The method according to claim 10, wherein said solar energy source further comprises a photovoltaic system.

12. The method according to claim 1, further comprising:
receiving at said computerized system, from a remote computerized system, additional data to be computed; and
wherein said adapting comprises using said received additional data to vary said computational workload.

13. A computer program product for managing computational workload in a computerized system powered by an energy source, the computer program product comprising:
a computer readable storage medium having computer readable non-transient program code embodied therein, the computer readable program code comprising:
computer readable program code configured to perform the step of:
adapting said computational workload at said computerized system according to a time-varying property of the power supplied by said energy source, wherein said power generated at said source is optimized;
powering said computerized system by said enemy source through a charge storage device;
varying, during adapting, said computational workload at said computerized system to deplete said charge storage device according to said time-varying property; and
obtaining, prior to said adapting, a maximum power point of said energy source;
wherein an optimal terminal voltage at said charge storage device and, in turn, an optimal voltage $V_{MPP}$ at an output of said energy source are determined;
and
wherein said adapting comprises varying said computational workload according to said determined optimal voltage $V_{MPP}$ at said output of said energy source.

14. A system for managing computational workload in a computerized system powered by an energy source, comprising:
means for adapting said computational workload at said computerized system according to a time-varying property of the power supplied by said energy source, wherein said power generated at said source is optimized;
a charge storage device, wherein said computerized system is powered by said enemy source through said charge storage device;
obtaining, prior to said adapting, a maximum power point of said energy source;
wherein an optimal terminal voltage at said charge storage device and, in turn, an optimal voltage $V_{MPP}$ at an output of said energy source are determined;
and
wherein said adapting comprises varying said computational workload according to said determined optimal voltage $V_{MPP}$ at said output of said energy source.

* * * * *